US005220853A

United States Patent [19]

[11] Patent Number: 5,220,853

[45] Date of Patent: Jun. 22, 1993

Sado et al.

[54] CAM SHAFT SUPPORT APPARATUS FOR AN ENGINE

[75] Inventors: Osamu Sado, Higashihiroshima; Kazuhiko Ueda, Hatsukaichi; Noriyuki Iwata, Hiroshima; Tatsuya Uesugi, Higashihiroshima; Shunji Masuda, Hiroshima, all of Japan

[73] Assignee: Matsushita Electric Industrial Co., Ltd., Osaka, Japan

[21] Appl. No.: 704,970

[22] Filed: May 23, 1991

[30] Foreign Application Priority Data

May 24, 1990 [JP] Japan ................................ 2-136545
May 25, 1990 [JP] Japan ................................ 2-136685

[51] Int. Cl.$^5$ ........................ F16H 57/02; F01M 1/06

[52] U.S. Cl. ............................... 74/606 R; 123/193.5; 123/90.3 A

[58] Field of Search ................... 74/606 R; 123/193.5, 123/572, 90.27, 90.34, 196 M

[56] References Cited

U.S. PATENT DOCUMENTS

| | | | |
|---|---|---|---|
| 3,051,149 | 8/1962 | Yordi | 123/90.34 |
| 4,505,236 | 3/1985 | Nakamura | 123/90.34 X |
| 4,709,667 | 12/1987 | Ichihara et al. | 123/90.27 X |
| 4,840,149 | 6/1989 | Fujita | 123/90.31 |
| 4,915,067 | 4/1990 | Imajo | 123/90.34 |
| 4,991,549 | 2/1991 | Sugiura | 123/90.34 X |
| 5,042,321 | 8/1991 | Hongo et al. | 74/606 R |
| 5,097,805 | 3/1992 | Uesugi et al. | 123/90.34 |
| 5,123,385 | 6/1992 | Sado et al. | 123/90.34 |

FOREIGN PATENT DOCUMENTS

| | | | |
|---|---|---|---|
| 55-144803 | 4/1954 | Japan . | |
| 238109 | 9/1990 | Japan | 123/90.34 |

*Primary Examiner*—Vinh T. Luong
*Attorney, Agent, or Firm*—Wenderoth, Lind & Ponack

[57] ABSTRACT

A cam shaft support device for an engine includes a cam carrier. A plurality of bearings are integrally formed with the cam carrier so as to rotatively support two cam shafts installed on a cylinder head. Each of the bearings are provided with a slit on a lower portion thereof so as to reduce the sliding resistance between the bearings and the cam shafts.

16 Claims, 11 Drawing Sheets

CAM SHAFT SUPPORT APPARATUS FOR AN ENGINE

BACKGROUND OF THE INVENTION

1. Field of the Invention

The present invention relates to a cam shaft support apparatus for an engine, and more particularly, to a cam shaft supporting structure for a DOHC engine including a pair of cam shafts for opening or closing suction valves and exhaust valves for each of a number of cylinders.

2. Description of the Prior Art

In a DOHC, i.e. double overhead cam shaft, type engine for use in an automobile, one cam shaft for suction valves and another cam shaft for exhaust valves are provided on a cylinder head and are interlocked by a rotation force transmission means. By inputting an engine rotation force to either one of the pair of cam shafts, these shafts are rotated in synchronization with each other so as to open and close respective suction valves and exhaust valves by means of swing crank arms.

This type of DOHC engine, wherein a cam shaft for suction valves and a cam shaft for exhaust valves are arranged in parallel on a cylinder head, is generally known, for example, in Japanese Utility Model Application Publication No. Sho 61-171801.

For example, as shown in FIG. 13, in a swing arm cam shaft support structure of a conventional DOHC engine of the typing having two suction valves and two exhaust valves as viewed in the longitudinal direction (in FIG. 13, in the right & left direction) of the cylinder head 201, a suction valve side bearing 202 is arranged between two HLA bosses 203 for suction valves, namely between two suction valve guides 204. By this bearing 202 and a cap (not shown) tightened by bolts onto the upper surface of the bearing 202, the suction valve side cam shaft (not shown) is rotatively supported. Similarly, an exhaust valve side bearing 205 is arranged between two HLA boss portion 206 for exhaust valves, namely, between two exhaust valve guides 207.

Furthermore, as shown in FIG. 14, in a direct type of support structure of a conventional two suction valve and two exhaust valve type of engine, viewed in the longitudinal direction (in FIG. 14, right and left direction) of the cylinder head 208, a suction valve side bearing 209 is arranged between two HLA boss portions 210 for suction valves, and an exhaust valve side bearing 211 is arranged between two HLA boss portions 212 for exhaust valves.

In the above-described conventional cam shaft support structure, in order to reduce the sliding resistance between the cam shaft and the bearing portion, the thickness in the axial direction of the bearing is generally reduced at the lower portion thereof.

In the conventional bearing portion, however, since oil supplied to the bearing portion reaches only part of the sliding surface of the bearing and a sufficient oil film is not formed, there is a problem in that the sliding resistance is not reduced so very much. Also, since the thickness in the axial direction of the bearing is reduced, there is a problem in that the P V value becomes high at a high rotation of the cam shaft, and the bearing reliability is reduced.

In addition, since the lubrication performance of oil is greatly reduce at an engine start operation under an extremely cold temperatures, it is necessary to set the clearance between the cam shaft and the bearing at a large value in consideration of this matter. For this reason, there is a problem in that the cam shaft support rigidity is reduced at an high speed rotation, and an abnormal behavior of the valve driving system takes place.

Furthermore, when a bending load is applied to the cam shaft, the cam shaft undergoes a bending deformation such that the cam shaft is projected radially approximately at a central portion of the bearing, and this projecting portion thereof causes a strong contact with the central portion of the bearing, namely so-called uneven contact. There is such a problem in that on the portion where an even contact takes place, there may take place bearing gall.

Although a counter measure of in achieving reduction of the sliding resistance by increasing the oil amount supplied to the bearing is conceivable against these problems, this will result in a problem in that the oil supply system becomes bulky, leading to a bulky size of the engine.

SUMMARY OF THE INVENTION

Therefore, the essential object of the present invention is to provide, in a DOHC engine having plural suction and exhaust valves for each cylinder, a cam shaft support structure which is of a light weight, and yet is capable of increasing the rigidity thereof and decreasing the bearing load.

The present invention has been worked out in view of the conventional problems as described above, and the essential problem of the present invention is to provide, in a DOHC engine, a cam shaft support device for said the engine which is capable of decreasing the sliding resistance between the cam shaft and the bearings while raising the cam shaft bearing support rigidity, and also preventing an uneven contact of the cam shaft with the bearings from taking place.

In order to accomplish the above-described object, according to a first feature of the present invention, there is provided a cam shaft support device for an engine which comprises a cam carrier attached on a cylinder head and including a plurality of bearings formed integrally thereon so as to rotatively support two cam shafts. A slit is provided on the lower portion of each bearing so as to extend in a direction perpendicular to the axial direction of the bearing.

According to the above arrangement of the present invention, since slits are formed on respective bearings formed integrally with the cam carrier, the bearing width in the axial direction becomes relatively small and the width becomes approximately uniform in the circumferential direction. Therefore, oil spreads over the bearing easily, and an oil film can be formed all over the sliding surface of the bearing, consequently raising the lubrication performance of the bearing. Also, since the bearing sliding contact area with the cam shaft is reduced, it is possible to reduce the sliding resistance while maintaining the rigidity. For this reason, the clearance between the cam shaft and the bearing can be set to be small and the cam shaft support rigidity of the bearings can be raised.

In addition, as described earlier, even when such a bending deformation projecting outward approximately at the central portion of a bearing is caused on the cam shaft by a load acting on the cam shaft, since the outward projecting portion enters into the slit, it does not contact the bearing. Therefore, it is possible to prevent the uneven contact of the cam shaft while maintaining the rigidity of the cam carrier on the whole, and to prevent the galling of the bearing due to uneven contact.

Furthermore, since the bearing stress of the oil in the bearing becomes small, the temperature rise of the oil can be suppressed.

Furthermore, according to a second feature of the present invention, there is provided a cam shaft support device for an engine which is adapted so that in the above-described cam shaft support device, the groove width of a slit is set to be narrow for the bearing supporting the cam shaft driving the larger number of valves, while the groove width of a slit is set to be wide for the bearings supporting the cam shaft driving the smaller number of valves.

According to the above second feature of the present invention, operations and effects similar to those of the first aspect of the present invention are obtained.

Also, at the bearings supporting the cam shaft driving a larger number of valves, namely, having a larger load, since the slit groove width is made narrow, it is possible to sufficiently raise the cam shaft support rigidity while reducing the sliding resistance. On the other hand, at the bearings supporting the cam shaft driving a smaller number of valves, namely, having a smaller load, since the slit groove width is made small, it is possible to greatly reduce the sliding resistance while maintaining the necessary cam shaft support rigidity.

According to a third feature of the present invention, the cam shaft support structure for a DOHC engine is so adapted in a DOHC engine such that a pair of cam shafts performing opening and closing of suction and exhaust valves are supported by bearing portions integrally formed with a cam carrier to be attached on the upper surface of the cylinder head. A rigid portion connects ignition plug boss portions provided on the central portion of the cam carrier, and bearing portions for the suction valve side cam shaft and bearing portions for the exhaust valve side cam shaft are provided so as to connect the rigid portion and both sides of the cam carrier and further to deviate bearing portions for the suction valve cam shaft form corresponding bearing portions for the exhaust valve cam shaft in the cam shaft axial direction.

With the above construction, since a rigid portion is provided on the central portion of the cam carrier, this rigid portion and both side portions are connected by the cam shaft bearing portions, and bearing portions on the suction valve side and those on the exhaust valve side are arranged so as to deviate from each other in the cam shaft axial direction, and a rigid rib structure can be obtained on the cam carrier. Also, the stress acting from the cam shaft side may be easily scattered, the rigidity of the carrier on the whole is increased and the bearing load is alleviated.

Furthermore, since the thick rigid portion is provided on the central portion of the cam carrier only, it becomes possible to manufacture the cam carrier at so as to be light-weighted.

BRIEF DESCRIPTION OF THE DRAWINGS

These and other objects and features of the present invention will become apparent from the following description taken in conjunction with preferred embodiments thereof with reference to the accompanying drawings, in which.

DETAILED DESCRIPTION OF THE INVENTION

Figure 1:
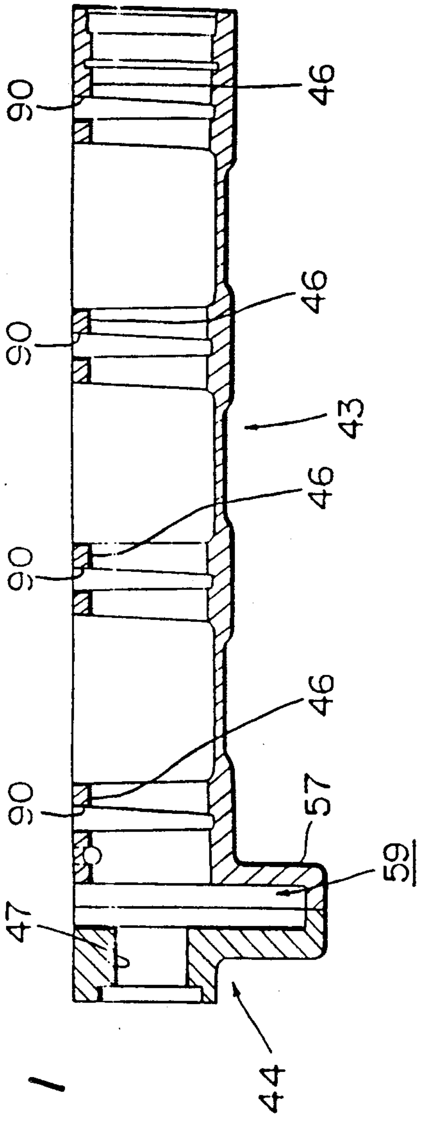
FIG. 1 is a longitudinal sectional view along line 1—1 of in FIG. 2 of a cam carrier and cover member provided in a cam shaft support device according to a first embodiment of the present invention.

Hereinbelow, preferred embodiments of the present invention will be concretely described with reference to the accompanying drawings.

First Embodiment

FIGS. 1 to 7 show a cam shaft support apparatus for an engine according to a first embodiment of the present invention. As shown in FIG. 41, a three suction valves two exhaust valves type DOHC engine EN is so arranged that when the first to third suction valves 1 to 3 are opened, the fuel air mixture is taken into a combustion chamber 7 from the first to third suction ports 4 to 6 and compressed by a piston (not shown) so as to be ignited and burned by an ignition plug 8. When the first and second exhaust valves are opened, the combustion gas is exhausted from the first and second exhaust ports 11 and 12. On the first suction valve 1, there are provided a valve body 13 for opening and closing the first suction port 4, a valve stem 14 for supporting the valve body 13, a valve guide 15 for supporting the valve stem 14 so as to slide in the axial direction thereof, a valve stem seal 16 for sealing the clearance between the valve stem 14 and the valve guide 15, an upper seat 18 connected to the upper end of the valve stem 14 through a cotter 17, and a spring 19 urging the valve stem 14 in the valve closing direction (upward) at all times through the upper seat 18. The upper end of the valve stem 14 is engaged with the suction valve cam 22 through a swing arm 21 so that the first suction valve 1 is opened and closed by the suction valve cam 22 with a predetermined timing. Here, the swing arm 21 is connected to a suction valve HLA (hydro-lash adjuster) 23. This suction valve HLA 23 is arranged to be engaged with the swing arm 21 through a plunger 25 by the pressure of oil supplied through a suction valve side first HLA oil passage formed in the cylinder head H so as to prevent the occurrence of clearance between the valve stem 14 and the swing arm 21. It is to be noted here that, although not illustrated, the second and third suction valves 2 and 3 are substantially of the same construction as the first suction valve 1.

In the same manner as the first suction valve 1, on the first exhaust valve 9 there are provided a valve body 26, a valve stem 27, a valve guide 28, a valve stem seal 29, a cotter 30, an upper seat 31, and a valve spring 32. The upper end of the valve stem 27 is engaged with the exhaust valve cam 35 through a swing arm 34 so that the first exhaust valve 9 is opened and closed by the exhaust valve cam 35 with a predetermined timing. Furthermore, the swing arm 34 is connected with an exhaust valve HLA 36 provided with a plunger 38, with oil being supplied to this exhaust valve HLA 38 through an exhaust valve side HLA oil supply passage 37. Although not illustrated, the second exhaust valve 10 is of the same construction as the first exhaust valve 9.

A plurality of suction valve cams 22 (only one cam is shown) are installed on a suction valve cam shaft 41, and the cam shaft 41 is installed on the upper surface of a cylinder head H so as to be rotatively supported by a cam carrier 43 to be described later and a cover member 44 (refer to FIG. 5). Furthermore, a plurality of exhaust valve cams 35 (only one cam is shown) are installed on an exhaust valve cam shaft 45 so as to be rotatively supported by the cam carrier 43 and the cover member 44 (refer to FIG. 5).

The drive mechanism for both cam shafts 41 and 45 will be described below.

Figure 5:
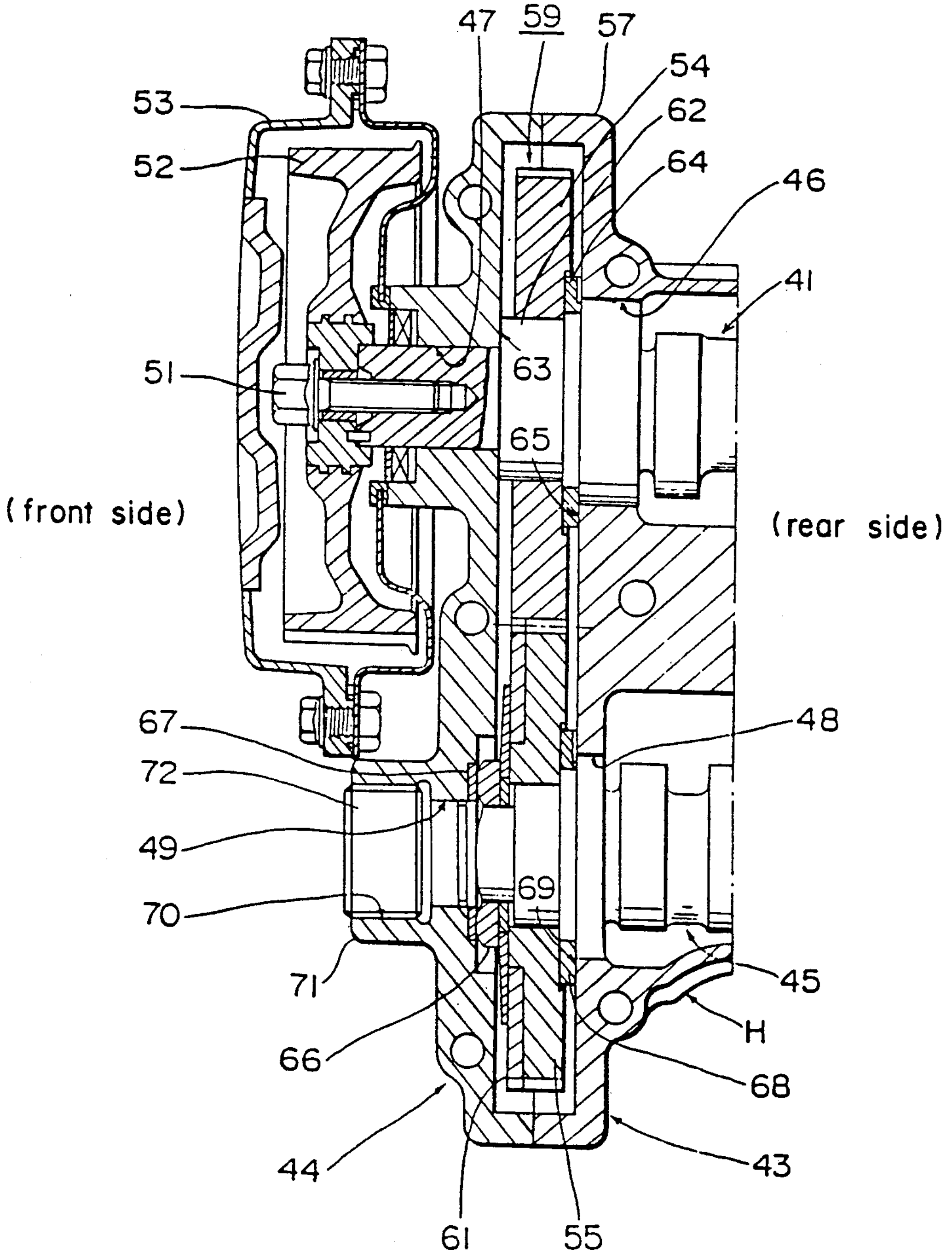
FIG. 5 is an enlarged sectional view along line 5—5 of the engine shown in FIG. 4.

As shown in FIG. 5, the suction valve cam shaft 41 is arranged to extend in the longitudinal direction (right and left direction, in FIG. 5) of the cylinder head H, and is rotatively supported by a plurality of suction valve side bearings 46 (only one bearing is shown) formed on the cam carrier 43 and a suction side end bearing 47 formed on the cover member 44. On the other hand, the exhaust valve cam shaft 45 is arranged on the cylinder head in parallel with the suction valve cam shaft 41 and is rotatively supported by a plurality of exhaust valve side bearings 48 (only one bearing is shown) formed on the cam carrier 43 and an exhaust valve side end bearing 49 formed on the cover member 44.

On the front end portion (the left end portion, in FIG. 5) of the suction valve cam shaft 41, a timing pulley 52 is installed with a stud bolt 51, and a timing belt (not shown) is connected between this timing pulley 52 and a crank pulley (not shown) so that the suction valve cam shaft 41 is directly driven by the crank shaft so as to rotate in synchronization at half of the speed of the engine revolutions. Furthermore, a pulley cover 53 is provided to cover the timing pulley 52.

Somewhat backward (right side, in FIG. 5) from the timing pulley 52, a suction valve side inter-cam gear 54 is provided on the suction valve cam shaft 41. On the other hand, on the exhaust valve cam shaft 45, there is provided an exhaust valve side inter-cam gear 55 so as to engage with the suction valve side inter-cam gear 54. Here, as will be described later, both inter-cam gears 54 and 55 are arranged in an inter-cam holding case 59 formed by the cover member 44, a gear cover case 57 integrally formed with the front end portion of the cam carrier 43, and a groove portion formed on the upper portion of the cylinder head H (refer to FIG. 6). The exhaust valve cam shaft 45 is thus driven by the suction valve cam shaft 41 through both inter-cam gears 54 and 55. Furthermore, in order to prevent backlash, a friction gear 61 is provided on the exhaust valve cam shaft 45.

The suction valve cam shaft 41 is arranged to have a larger diameter at a gear support portion 62 within the inter-cam gear holding case 59 than at the portion on the front end side therefrom. By this arrangement, the front end surface of the gear support portion 62 contacts the rear face of the cover member 44, whereby the displacement of the suction valve cam shaft 41 in the front end direction is restricted. In other words, the rear extended surface portion of the cover member 44, which is in sliding contact with the gear support portion 62, constitutes a suction valve side front thrust bearing 63. Furthermore, on the immediate rear side of the gear support portion 62, there is provided a suction valve side thrust plate 64 of a little larger diameter than that of the gear support portion 62, and the rear end surface of this thrust plate 64 is in sliding contact with the front side extended surface of the gear cover portion 57 (cam carrier 43), whereby the displacement of the suction valve cam shaft 41 in the rear direction is restricted. In other words, the front side extended portion of the gear cover portion 57, which is in sliding contact with the suction valve side thrust plate 64, constitutes a suction valve side rear thrust bearing 65. And on the immediate rear side of this suction valve side rear thrust bearing 65, and adjacently thereto, three is provided one suction valve side bearing 46. In other words, the front end surface of the suction valve side bearing 46 constitutes the suction valve side rear thrust bearing 65.

On the immediate front side of the exhaust valve side inter-cam gear 55, a lock nut 66 is mounted on the exhaust valve cam shaft 45, with the front end thereof being arranged to come into sliding contact with a rear end surface of a thrust washer 67 so as to restrict the displacement of the exhaust valve cam shaft 45 in the front direction. In other words, the thrust washer 67 functions as a thrust bearing for the exhaust valve cam shaft 45 against the displacement thereof in the front direction. Furthermore, as on the side of the suction valve cam shaft 41, there is also provided, on the side of the exhaust valve cam shaft 45, an exhaust valve side thrust plate 68 so as to restrict the rear direction displacement of the exhaust valve cam shaft 45, and the front side extended surface portion of the gear cover portion 57, which is in sliding contact with the thrust plate 68, constitutes an exhaust valve side rear thrust bearing 69.

Furthermore, on the cover member 44, in front of the exhaust valve cam shaft 45, there is provided a blind plug boss 71 with a female threaded hollow portion 70 formed therein, and a blind plug 72 is threaded into the hollow portion 70.

The structure of the cam carrier 43 and cover member 44 supporting the cam shaft driving mechanism will be described below.

Figure 6:
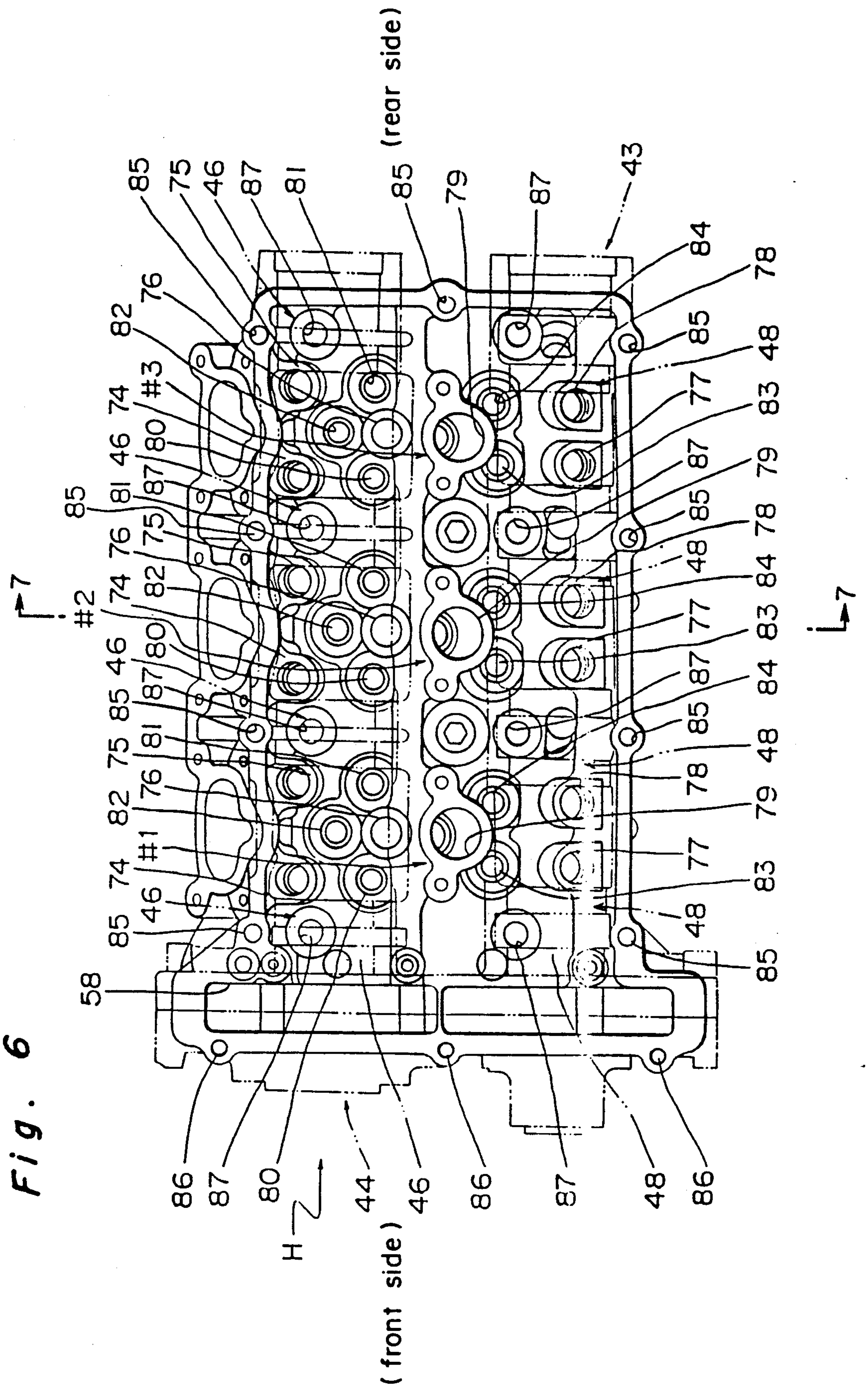
FIG. 6 is a plan view of a cylinder head of the engine shown in FIG. 4.
Figure 7:
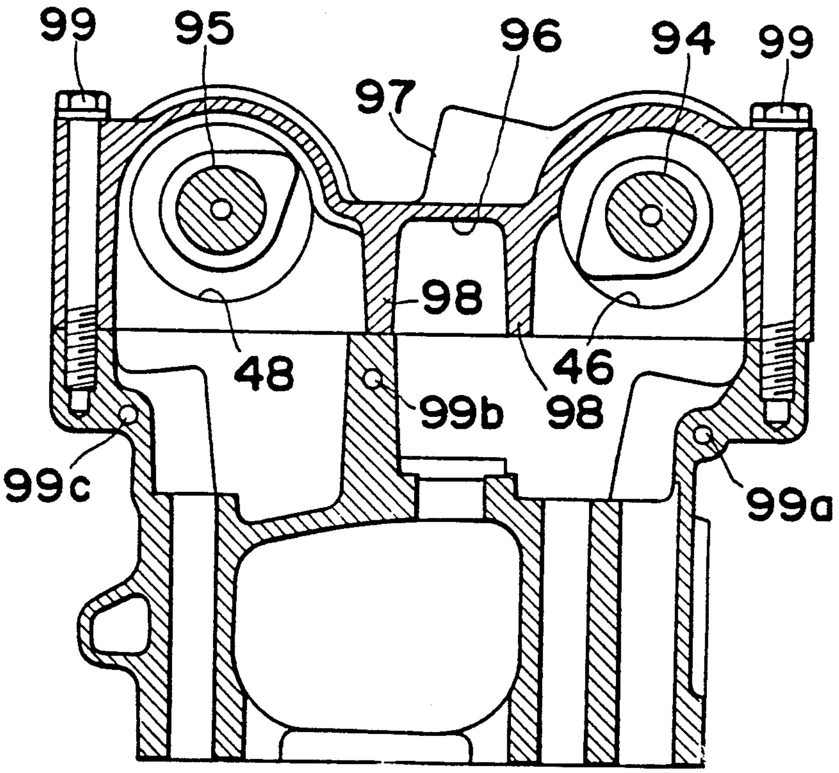
FIG. 7 is an enlarged sectional view along line 7—7 of the cylinder head as shown in FIG. 6.

As shown in FIG. 6, on the upper surface of the cylinder head H, there is provided a groove portion 58 for accommodating inter-cam gears 54 and 55 (refer to FIG. 5). Furthermore, for each cylinder, there are formed first and second suction valve HLA boss portions 74 and first and second exhaust valve HLA boss portions 77 and 78; a plug hole 79; first to third suction valve stem holes 80 to 82; first and second exhaust valve stem holes 83 and 84; a cam carrier bolt hole 85 for installing the cam carrier 43 onto the cylinder head H; a cover member bolt hole 86 for installing the cover member 44 onto the cylinder head H; and a head bolt hole 87 for installing the cylinder head H onto the cylinder block (not shown).

As described earlier, on the upper surface of the cylinder head H, there are installed the cam carrier 43 and the cover member 45. And on the cam carrier 43, there are integrally formed a plurality of suction valve side bearings 46 and exhaust valve side bearings 48. Here, the suction valve side bearings 46 and exhaust valve side bearings 48 are respectively arranged, viewed in the cylinder head longitudinal direction, at positions a little on the front side of the first cylinder #1, at positions middle between the first cylinder #1 and the second cylinder #2, at positions middle between the second cylinder #2 and the third cylinder #3, and at positions a little on the rear side of the third cylinder #3.

Figure 3:
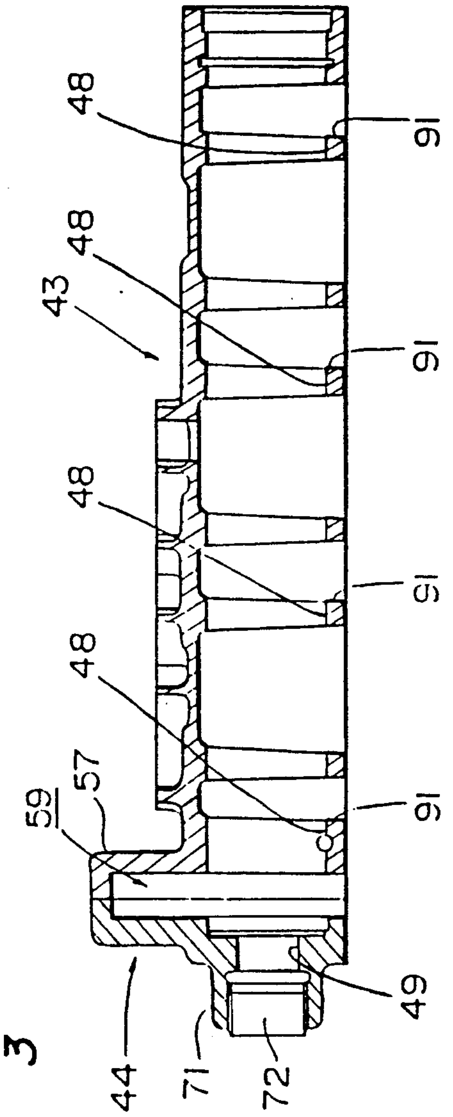
FIG. 3 is a sectional view along Line 3—3 of the cam carrier and cover member as shown in FIG. 2.
Figure 2:
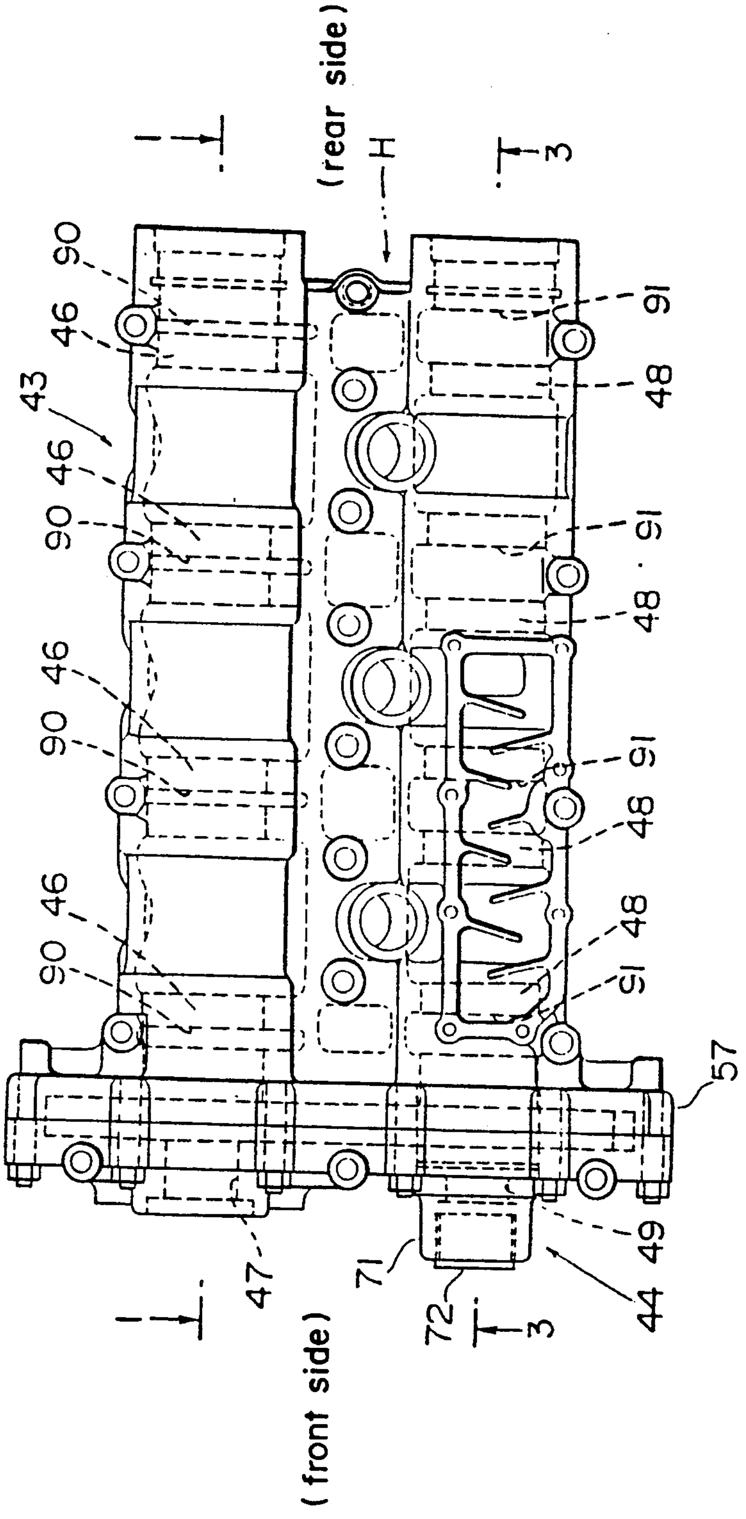
FIG. 2 is a plan view of the cam carrier and cover member as shown in FIG. 1.
Figure 4:
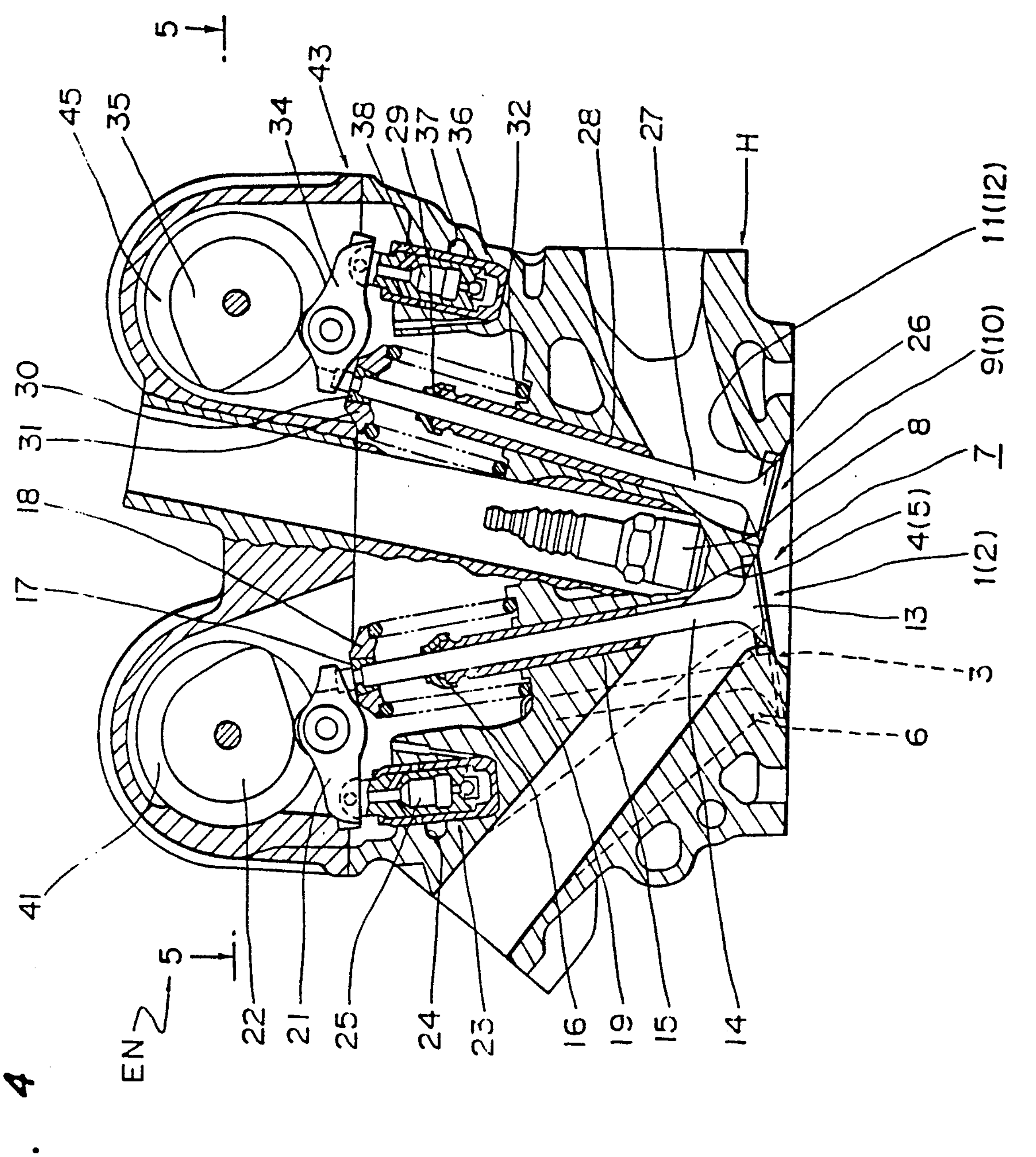
FIG. 4 is an enlarged cross-sectional view of a DOHC engine equipped with a cam shaft support device according to the present invention.

As shown in FIGS. 1 to 3, on the frond end of the cam carrier 43, the gear case 57 for covering both inter-cam gears 54 and 55 (refer to FIG. 5) is formed. And on the front side of said gear case 57 and adjacently thereto, there is formed the cover member 44 for covering the front end of both inter-cam gears 54 and 55 (refer to FIG. 5) and for supporting front ends of both cam shafts 41 and 45. The rear end portion of the cover member 44 is formed in a shape corresponding to the gear case portion 57, and the cover member 44 and the gear case portion 57 (cam carrier 43) are connected by bolts extending in the longitudinal direction of the cylinder head at in the vicinity of the circumferences thereof, and thus the inter-cam gear holding space 59 is formed by the cover member 44, the gear case portion 57 and the groove portion 58 (refer to FIG. 6) so as to accommodate inter-cam gears 54 and 55 (refer to FIG. 5) therein.

Meanwhile, viewed in the longitudinal direction of the cam carrier 43 (right and left direction in FIGS. 1 to 3), at the central portions of respective suction valve side bearings 46, there are formed, at the lower portions of respective bearings 46 suction valve side slits 90 of comparatively narrow groove width. Because of the formation of such suction valve side slits 90, the sliding contact area of each suction valve side bearing 46 can be reduced, resulting in a reduced sliding resistance. Furthermore, as described earlier, since an oil film can be formed approximately all over the sliding contact area of the suction valve side bearing 46, the lubrication performance can be raised. Since the lubrication performance can be raised, the clearance between the suction valve cam shaft 41 (refer to FIG. 5) and the suction valve side bearing 46 is set to be relatively small.

As described earlier, although the suction valve cam shaft 41 causes such a bending deformation as will project said cam shaft radially the largest at the middle portion of the suction valve side bearing 46, since this projecting portion enters into the suction valve side slit 90, the projection portion will not contact the suction valve side bearing 46. Therefore, no uneven contact takes place between the suction valve cam shaft 41 and the suction valve side bearings 46, and thus, bearing galling due to uneven contact can be prevented.

Further, as described earlier, since suction valve side bearings 46 are arranged, in the longitudinal direction of the cylinder head, on the front side of the first cylinder #1 (refer to FIG. 6), between respective cylinders (between bores) and on the rear side of the third cylinder #3 (refer to FIG. 6), oil flowing out of bearings 46 drops onto the cylinder head H (refer to FIG. 6) without touching the valve driving mechanism, and thus the occurrence of oil mist can be prevented. Furthermore, since the lubrication performance of the valve drive mechanism can be raised by utilizing the oil dropping onto the cylinder head H (refer to FIG. 6), it becomes easy to use such new materials as aluminum, titanium and ceramics etc., which require a high lubrication performance for the valve drive mechanism.

Here, since the suction valve cam shaft 41 drives more valves than the exhaust valve cam shaft 45, it is subjected to a larger load. Therefore, since the rigidity of the suction valve cam shaft 41 has to be raised, the groove width of the suction valve side slits 90 is set to be relatively narrow so as to reduce the sliding resistance while increasing the support rigidity for the suction valve cam shaft 41.

On the other hand, viewed in the longitudinal direction of the cam carrier 43, there are formed, at the lower central portions of respective exhaust valve side bearings 48, exhaust valve side slits 91 of relatively larger groove width. Since the groove width of said the exhaust valve side slits 91 is set to be wide, as described above, the sliding resistance between the exhaust valve cam shaft 45 and exhaust valve side bearings can be reduced to a large extent. Moreover, since the exhaust valve cam shaft 45 drives fewer valves, even when the groove width of the exhaust valve side slit 91 is widened, a sufficient support rigidity can be secured for the exhaust valve cam shaft 45.

In addition, in the cam carrier 43, a rigid body portion 98 (FIG. 7) for connecting ignition plug boss portions 97, formed on the cam carrier 43 in the cam shaft direction, is provided between the suction side bearings 46 and the exhaust side bearings 48. This rigid body portion 98 is formed of a thick thickness portion, as is clear from FIG. 7, and the suction side bearings 46 . . . 46 and exhaust side bearings 48 . . . 48 located on both sides thereof are provided so as to connect the rigid portion 98 with both sides portions of the cam carrier 43.

Furthermore, although installation portions for connecting the cam carrier 43 to the cylinder head are provided on the cam carrier 43, installation portions are provided on both side portions between two suction side bearings 46, and between two exhaust side bearings 48, respectively. Installation portions are also provided on the rigid portion 98 for each cylinder, at two positions, holding an ignition plug boss therebetween in the cam shaft axis direction and located close to the boss. And the cam carrier 43 is connected with the cylinder head by tightening bolts 99 onto the cylinder head at the position of the installation portions.

Second Embodiment

FIGS. 8 to 12 show a cam shaft support apparatus for an engine according to a second embodiment of the present invention.

Figure 9:
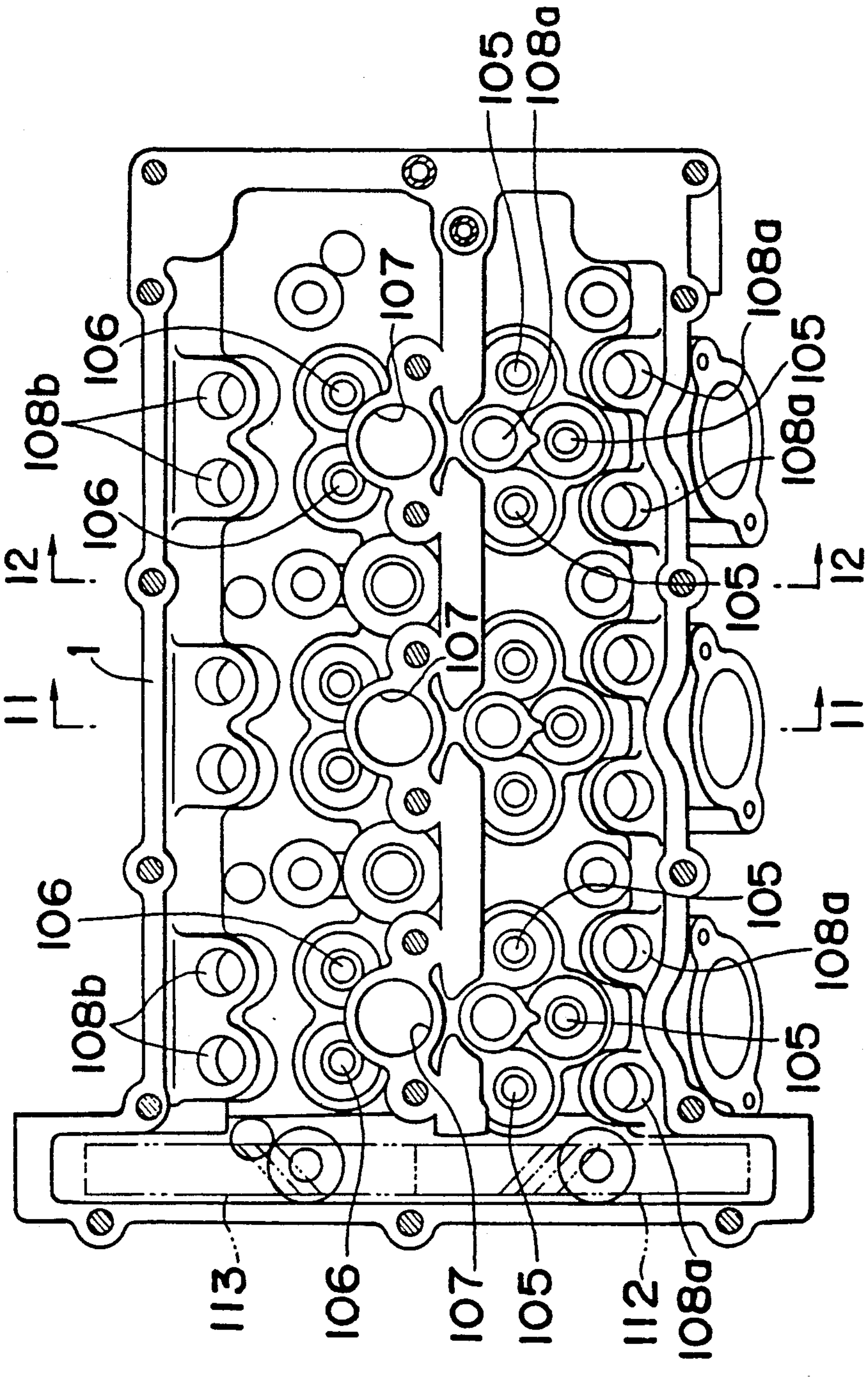
FIG. 9 is a plan view of a cylinder head as shown in FIG. 8.
Figure 12:
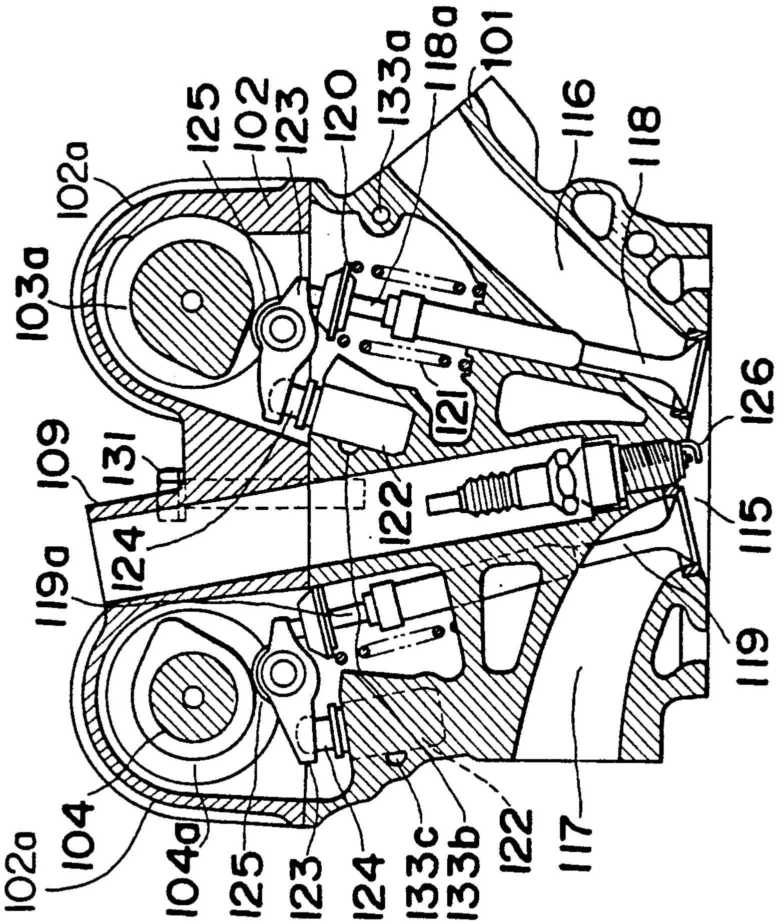
FIG. 12 is an enlarged sectional view along line 12—12 of the cylinder head as shown in FIG. 9 in the arrow direction.
Figure 11:
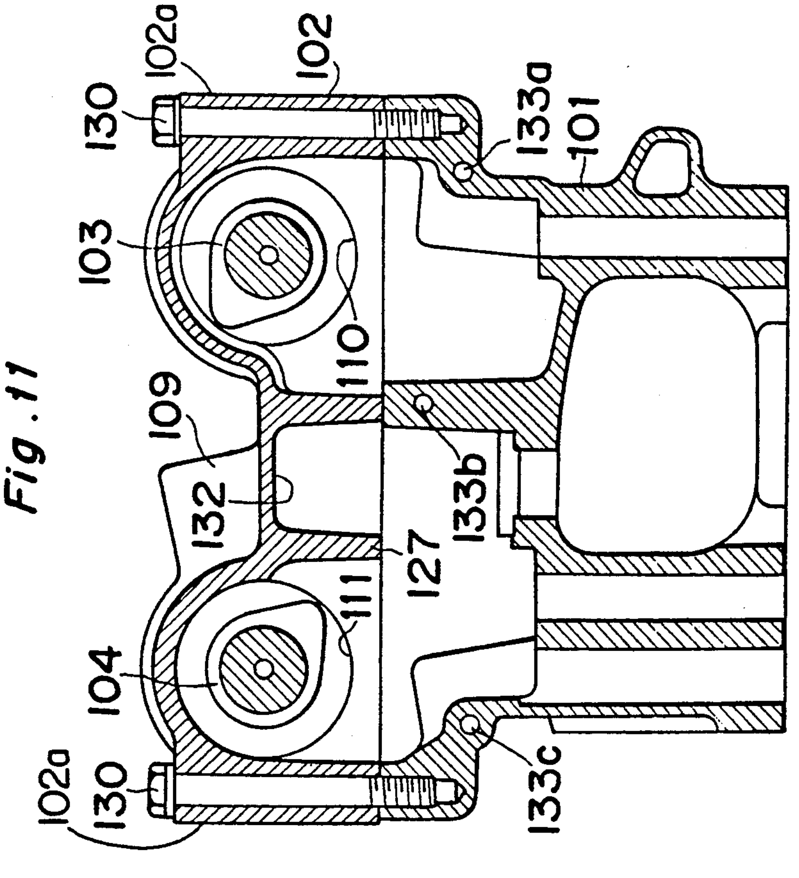
FIG. 11 is an enlarged sectional view along line 11—11 of the cylinder head as shown in FIG. 9 in the arrow direction.
Figure 13:
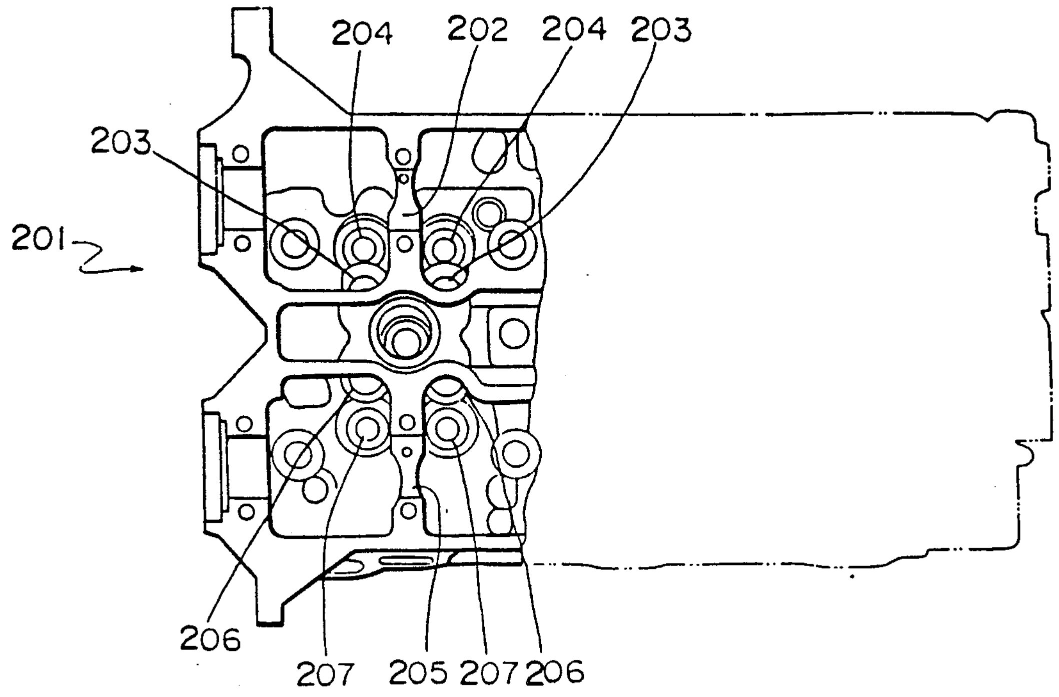
Fig. 13 PRIOR ART
FIG. 13 is an explanatory plan view of a cylinder head of a conventional DOHC engine provided with a swing arm type cam shaft support device.
Figure 14:
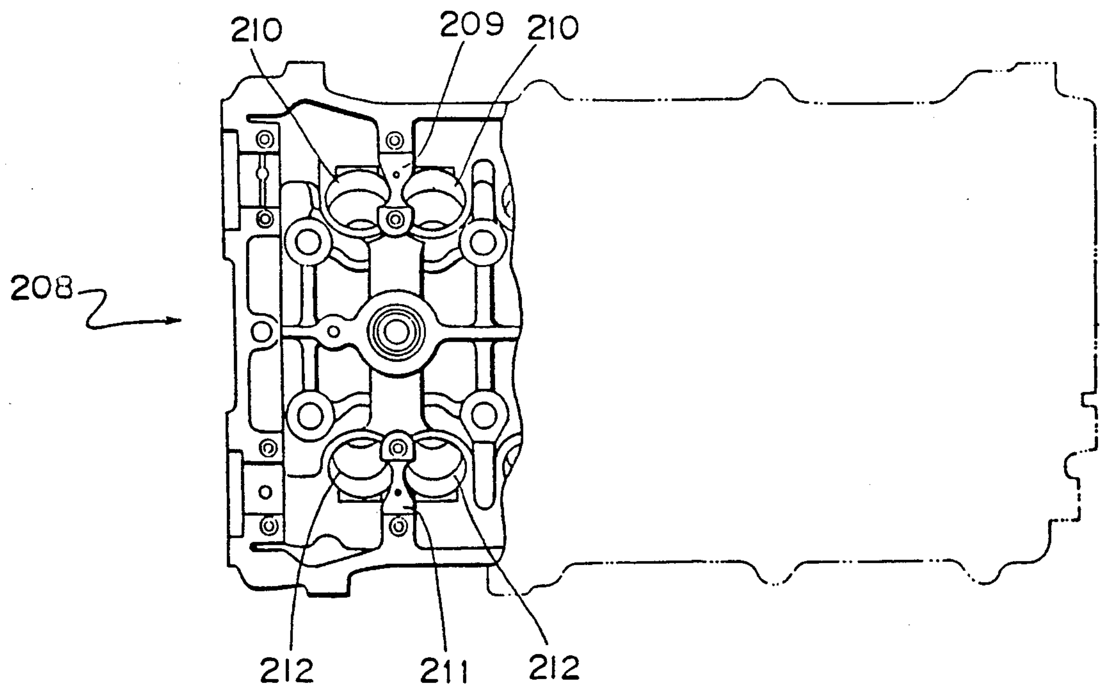
Fig. 14 PRIOR ART
FIG. 14 is an explanatory plan view of a cylinder head of a conventional DOHC engine provided with a direct type cam shaft support device.

The cylinder head 101 shown in FIG. 9 is a kind of cylinder head applied to a V type DOHC engine A having six cylinders of a V type, shown in FIG. 9 with only one side bank. A plurality of suction valves and exhaust valves are provided for each cylinder, for instance three suction valves and two exhaust valves, the number of valves being different between suction valves and exhaust valves for each cylinder. On the head 101, there is installed a cam carrier 102, which comprises a cam carrier body that is constructed so as to serve as a cam cap and a head cover. In the space of an oil jacket formed between the cylinder head 101 and the cam carrier 102 there are provided a cam shaft 103 for driving suction valves, as shown in FIGS. 11 and 12, and a cam 104 for driving exhaust valves.

On the cylinder head 101, openings 105 are for installing suction valves, openings 106 for exhaust valves, openings 107 for ignition plugs. In addition to these openings, openings 108*a* and 108*b* for a hydraulic valve lash mechanism to be described later are formed. Since there is no extra space on the cylinder head 101, bearing portions for the cam shafts 103 and 104 are formed on the cam carrier 102.

Figure 8:
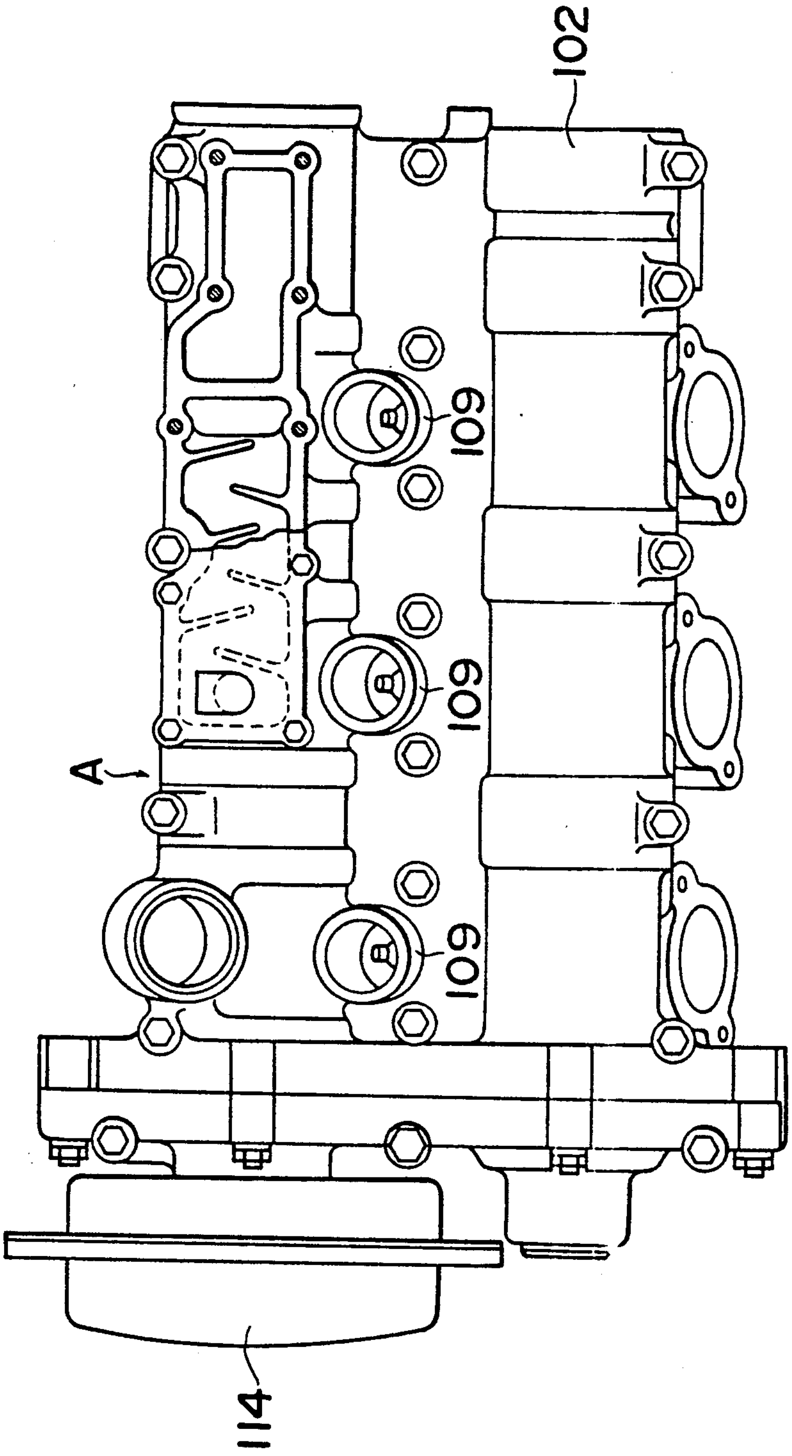
FIG. 8 is a plan view of a DOHC engine according to a second embodiment of the present invention.

More specifically, as is clear from FIGS. 8 and 9, on the cam carrier 102, three boss portions 109 for ignition plug installation are formed so as to correspond to the combustion chamber of each cylinder in the central portion thereof, and on the lower surface of the carrier 102, bearing portions 110 and 111 for the suction valve cam shaft and the exhaust valve cam shaft, respectively are formed on both sides with said ignition plug boss portions disposed therebetween. Suction valve cam shaft 103 and exhaust valve cam shaft 104 pass through these bearing portions 110 and 111 respectively, and are rotatively supported thereon. The detailed structure of said cam carrier 102 will be described later.

Furthermore, a cam shaft gear 112 and a cam shaft gear 113 are mounted on the ends of said suction cam shaft 103 and the exhaust cam shaft 104, respectively, so as to be engaged with each other, and the shaft end of the exhaust valve cam shaft 104 protrudes from the cylinder head 101 with a cam pulley (not shown), enclosed by a cover 114, shown in FIG. 8, being mounted thereon. The cam pulley is interlocked with the crankshaft through a belt.

Therefore, when the exhaust valve cam shaft 104 is rotated by the turning force of the engine from the crankshaft, by the engagement of the cam shaft gears 112 and 113, the suction valve cam shaft 103 is also rotated in synchronization therewith.

Now, the valve operating mechanism for driving suction valves and exhaust valves with the cam shafts 103 and 104 will be described with reference to FIG. 12. With respect to the cylinder head 101, there are formed combustion chambers 115 corresponding to the cylinder bore of each cylinder on the lower surface thereof, and suction ports 116 and exhaust ports 117 are communicated with the combustion chamber 115. Suction valves 118 and exhaust valves 119 are installed on communication portions of with the suction ports 116 and exhaust ports 117, respectively. Respective valve stems 118*a* and 119*a* of these the suction valves 118 and exhaust valves 119 pierce through said suction valve installation openings 105 and exhaust valve installation openings 106 and project into the upper surface of the cylinder head so as to be slidable in the opening portion. On the respective heads of the valve stems 118*a* and 119*a*, circular disk-shaped spring retainers 120 are mounted with compressed springs 121 being mounted between the spring retainers 120 and the cylinder head 101, whereby suction and exhaust valves 118 and 119 are pushed upward by the spring force to urge the valves in the closing direction.

Furthermore, on the upper surface of the cylinder head 101, valve lash mechanisms 122, to be operated by hydraulic oil, are mounted in suction side openings 108*a* and exhaust side openings 108*b* corresponding to suction valves 118 and exhaust valves 119, respectively. One end of each of swing arms 123 is mounted on the pivot 124 of the valve lash mechanism 122, with the other end thereof being mounted on the spring retainer 120. With rollers 125 attached to the middle portions of these swing arms 123, cam portions 103*a* of the cam shaft 103 are in contact on the suction valve side, and cam portions 104*a* of the cam shaft 104 are in contact on the exhaust valve side.

Because of such an arrangement in the valve operation mechanism, as the suction side cam shaft 103 and the exhaust side cam shaft 104 rotate, interlocking with each other, swing arms 123 swing up and down in accordance with the lift amounts of the respective cam portions 103*a* and 104*a* around the respective end portions of the valve lash mechanisms 122 which are adapted as a center of swinging. The end portions of the swing arms 123 on the sides of valve stems 118*a* and 119*a* thereby swing up and down, in interlocking movement with these swing motions to open and close the suction valves 118 and exhaust valves 119. Furthermore, in openings 107, ignition plugs 126 are installed so as to confront the combustion chamber 115.

Meanwhile, as is clear from the arrangement of suction valve installation openings 105 shown in FIG. 9, three suction valves 118 in each cylinder are arranged in a triangular arrangement. Two suction valves 118 are in such a relationship with the central suction valve 118, in other words, the opening 105, that these suction valves on both sides thereof are aligned in a longitudinal direction of engine A, i.e., the right and left direction in FIG. 9, and positioned at positions closer to the center of the combustion chamber 115 as compared with the central suction valve. Corresponding to this arrangement, the openings 108*a* for the valve lash mechanisms are provided on the cylinder head 101 in a triangular arrangement enclosing the central suction valve 118 so as to install the valve lash mechanisms 122 there around.

On the other hand, two exhaust valves 119, that is, the openings 106 in each cylinder, are provided at positions close to the center of the combustion chamber 115 so as to be aligned in the longitudinal direction of engine A. The openings 108*b* for valve lash mechanisms are arranged at the outside thereof so as to be aligned in the longitudinal direction of engine A, with respective valve lash mechanisms 122 being mounted thereon.

Figure 10:
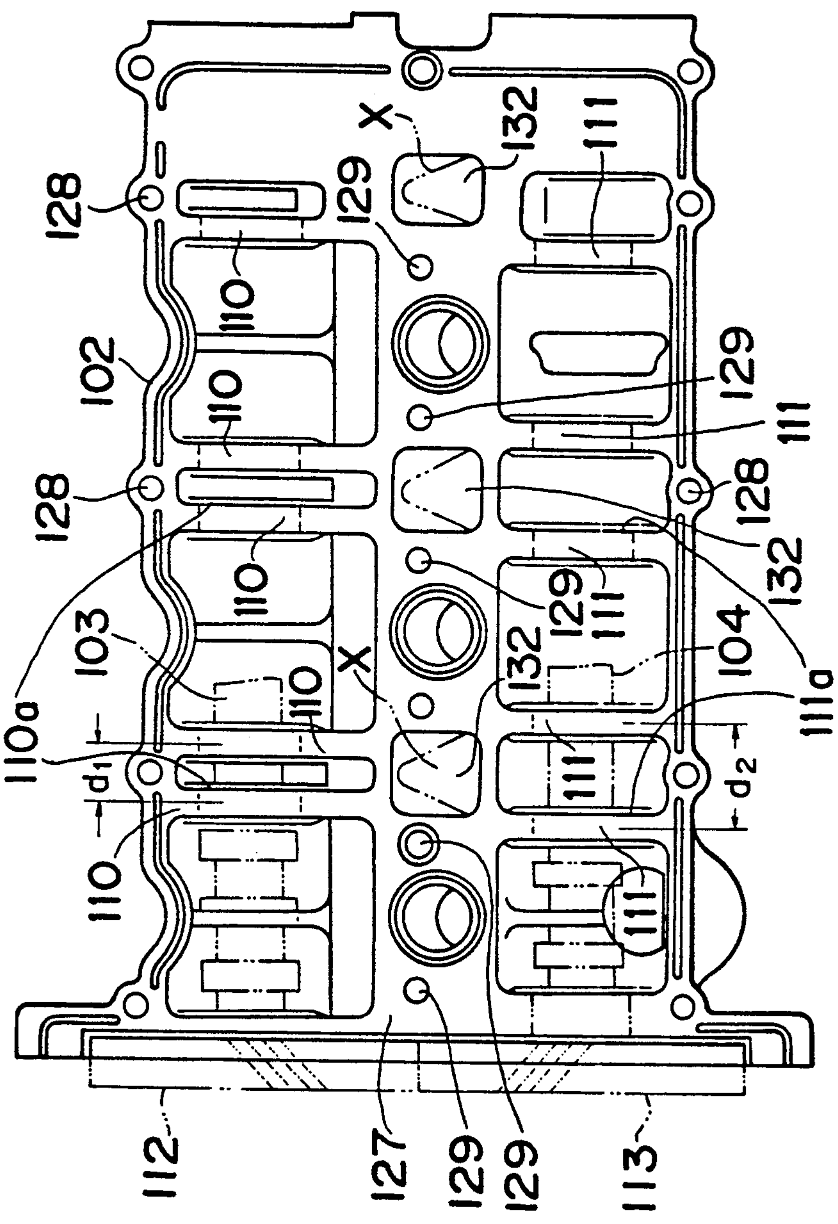
FIG. 10 is a lower side plan view of a cam carrier.

Corresponding to the arranged structure for the suction valves 118 and the exhaust valves 119, as is apparent from FIG. 10, the cam shaft bearings provided on the cam carrier 102 are arranged such that the suction side bearings 110 and exhaust side bearings 111 are disposed at different positions with each other. More specifically, though these bearings 110 and 111 are provided between cylinders and, more specifically, between cylinder bores or between combustion chambers, two of each of bearings 110 and 111 are arranged, respectively, between every cylinder. The pairs of bearings 110 and the pairs of bearings 111 have respective slits 110*a* and 111*a* therebetween, as can be seen from FIG. 10. In addition, the distance $d_1$ between suction side bearings 110 and the distance $d_2$ between exhaust side bearings 111 are made different from each other, and the bearings 110 and the bearings 111 are deviated from each other in the cam shaft direction.

In addition, in the cam carrier 102, a rigid body portion 127 for connecting ignition plug boss portions 109 formed on said cam carrier 102 in the cam shaft direction is provided between suction side bearings 110 and exhaust side bearings 111. This rigid body portion 127 is formed of a thick thickness portion, as is clear from FIG. 11, and the suction side bearings 110 and exhaust side bearings 111 located on both sides thereof are provided connecting the rigid portion 127 with both opposite side portions 102*a* of the cam carrier 102.

Furthermore, although installation portions for connecting the cam carrier 102 to the cylinder head 101 are provided on the cam carrier 102, installation portions 128 are provided on both side portions 102*a* between two adjacent suction side bearing 110, and between two adjacent exhaust side bearings 111, respectively. Installation portions 129 are also provided on the rigid portion 127 for each cylinder, at two positions holding an ignition plug boss therebetween in the cam shaft axis direction and located close to the boss. And the cam carrier 102 is connected with the cylinder head 101 by tightening bolts 130 and 131 onto the cylinder head 101 at the positions of the said installation portions 128, and 129.

By the above-described structure of the cam carrier 102, a rib structure can be obtained in that a thick rigid portion 127 running in the cam shaft axis direction is positioned at the central portion of said the cam carrier 102, and suction side bearings 110 and exhaust side bearings 111 are arranged so as to connect the rigid portion 127 with both side portions 102*a*, and so as to be deviated from each other in the cam shaft axis direction, that is, in the longitudinal direction of the rigid portion.

For this reason, stress acting on the cam carrier 102 from cam shafts 103, 104 through the bearing portions 110 and 111 is dispersed into the rigid portion 127 and the large number of bearings 110, and 111 connected to the rigid portion 127. Stress concentration can thus be avoided, and therefore the rigidity of the cam carrier 102 against bending and torsion is raised with the bearing load of the cam carrier being alleviated.

Also, since the thick rigid portion 127 is located only on the central portion of the cam carrier 102, a useless weight increase of the carrier 102 can be avoided, and weight reduction can be accomplished which increasing the rigidity.

Furthermore, since the arrangement interval of the suction side bearings 110, and the arrangement interval of the exhaust side bearings 111 are different from each other, resulting in that the resonance frequencies of the cam carrier 102 are different from each other at both the side portions divided by rigid portion 127, the resonance between the suction side portion and the exhaust side portion can be avoided, radiation sound of the cam carrier due to resonance is alleviated, and the peak of the vibration can be suppressed at a low level.

Furthermore, since the installation (or bolt holes) portions 128 and 129 for fastening the cam carrier 102 to the cylinder head 101 are provided on the rigid portion 127 as well as both side portions 102*a* of the cam carrier, the junction between the cylinder head 101 and the cam carrier 102 can be made more tightly, and thus the sealing characteristic can be improved. Accordingly, since the sealing characteristics between ignition plug boss portions 109 and ignition plug installation openings 107 are also improved, contamination of the ignition plugs due to the entry into the boss portions 109 and the openings 107 of lubrication oil for suction and exhaust valves 118 and 119 and hydraulic oil for valve lash mechanisms can be avoided, and the leakage of the oil outside the engine can also be avoided. Furthermore, the vibration of the cam carrier 102 can also be suppressed.

In addition, since the arrangement relationships between the installation portions 128, on the cam carrier side portions which are provided between sets of bearings 110 and sets of bearing 111, and installation portions 29 on the rigid portion constitute triangles when viewed from the bearings 110 and 111 as respective centers thereof, the bearings 110 and 111 are firmly pressed by the bolts 130 and 131 and the support of cam shafts 103 and 104 becomes improved.

Furthermore, on the rigid portion 127, weight reduction of the cam carrier 102 is conducted by forming thin thickness portions 132 between ignition plug bosses, 109 while maintaining increased rigidity with the rigid portion 127. In this case, when the thin thickness portions 132 are formed in a triangular form with the apex directed between adjacent suction side bearings 110, with the smaller bearing interval $d_1$, as shown by a chain line X in FIG. 10, the suction side bearings 110 and the exhaust side bearings 111 on the other side of the rigid portion 127 become connected with each other so as to further raise the rigidity of the cam carrier 102.

Also, on the cylinder head 101, as shown in FIG. 11, there are provided oil passages 133*a*, 133*b* and 133*c* for supplying hydraulic oil to the valve lash mechanisms 122 for the suction and exhaust valves 118 and 119.

As is clear from the foregoing description, according to the present invention, a rigid portion is provided on the central portion of the cam carrier. The rigid portion and both end portions of the cam carrier are connected by cam shaft bearing portions. The suction side bearing portions and the exhaust side bearing portions are arranged so as to be deviated from each other in the cam shaft axis direction. Therefore, a rigid cam carrier structure can be obtained, the stress acting thereon from cam shafts becomes easily dispersed, the rigidity of the cam carrier as a whole is raised, and bearing loads are alleviated.

Furthermore, since the thick rigid portion is provided only on the central portion of the cam carrier, it becomes possible to manufacture the cam carrier with a light weight. For this reason, in a DOHC engine having plural suction valves and exhaust valves for each cylinder, a cam carrier which is lightweight and of a high rigidity for cam shaft support can be obtained.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A cam shaft support arrangement for an engine, comprising:

a cylinder head;

a suction valve operating cam shaft and an exhaust valve operating cam shaft; and a cam carrier mounted on said cylinder head having first and second sets of bearings integral therewith rotatably supporting said suction valve operating cam shaft and said exhaust valve operating cam shaft, respectively;

wherein said cylinder head defines an upper end of a plurality of cylinders;

wherein said first and second sets of bearings of said cam carrier each includes pairs of bearings disposed between said cylinders; and wherein each said pair of bearings, disposed between two said cylinders, comprises two bearings having a slit therebetween extending in a direction perpendicular to the axial direction of said cam shafts such that the respective said cam shaft is unsupported at said slit.

2. The cam shaft support arrangement of claim 1, wherein each said cam shaft has a plurality of cams thereon for each said cylinder, the number of said cams provided for each said cylinder being greater on one said cam shaft than the other said cam shaft.

3. The cam shaft support arrangement of claim 2, wherein said slits between said pairs of bearing supporting the one said cam shaft are wider than said slits between said pairs of bearings supporting the other said cam shaft.

4. The cam shaft support arrangement of claim 1, wherein said two bearings of each said pair of bearings supporting one said cam shaft between two said cylinders are nonaligned, in a direction perpendicular to the axial direction of said cam shafts, with the respective said two bearings of said pair of bearings supporting the other said cam shaft between the same two said cylinders.

5. The cam shaft support arrangement of claim 4, wherein each said cam shaft has a plurality of cams thereon for each said cylinder, the number of said cams provided for each said cylinder being greater on one said cam shaft than the other said cam shaft.

6. The cam shaft support arrangement of claim 5, wherein said slits between said pairs of bearings supporting the one said cam shaft are wider than said slits between said pairs of bearings supporting the other said cam shaft.

7. The shaft support arrangement of claim 1, wherein:

said cam carrier has a plurality of ignition plug boss portions spaced thereon in the axial direction of said camshafts, and a rigid portion disposed centrally between opposite side portions of said cam carrier and connecting said ignition plug boss portions in the axial direction of said cam shafts;

said pairs of bearings of said first set of bearings connect said rigid portion with one said side portion of said pairs of bearings of said second set of bearings connect said rigid portion with the opposite said side portion; and said two bearings of each said pair of bearings supporting one said cam shaft between two said cylinders are nonaligned, in a direction perpendicular to the axial direction of said cam shafts, with the respective said two bearings of said pair of bearings supporting the other said cam shaft between the same two said cylinders.

8. The cam carrier of claim 7, wherein each said pair of bearings in the respective said first set is nonaligned with the corresponding said pair of bearings of said second set because said slits of the corresponding said pairs of said first and second sets have different widths.

9. The cam carrier of claim 8, wherein said pairs of bearings connect said rigid portion with said opposite side portions at points on said rigid portion between said ignition plug boss portions.

10. The cam carrier of claim 7, wherein said pairs of bearing connect said rigid portion with said opposite side portions at points on said rigid portion between said ignition plug boss portions.

11. The cam carrier of claim 7, wherein bolt holes are provided in said opposite side portions at each said slit between said pairs of bearings and bolt holes are provided in said rigid portion such that two said bolt holes are disposed on opposite sides of each said ignition plug boss portion.

12. A cam carrier for supporting cam shafts in an engine, comprising:

a cam carrier body having front and rear portions and opposite side portions;

a plurality of ignition plug boss portions spaced on said cam carrier body in a longitudinal front-to-rear direction thereof;

a rigid portion on said cam carrier body disposed centrally between said side portions and connecting said ignition plug boss portions in the longitudinal front-to-rear direction; and first and second sets of bearings integral with said cam carrier body, said first set of bearings comprising first pairs of bearings connecting said rigid portion with one said side portion, said second set of bearings comprising second pairs of bearings connecting said rigid portion with the opposite said side portion, each said pair of bearings comprising two bearings having a slit therebetween, said pair of bearings of said first set having corresponding said pairs of bearings in said second set, and each said pair of bearings in the respective said first set being nonaligned with the corresponding said pair of bearings of said second set.

13. The cam carrier of claim 12, wherein each said pair of bearings in the respective said first set is nonaligned with the corresponding said pair of bearings of said second set because said slits of the corresponding said pairs of said first and second sets have different widths.

14. The cam carrier of claim 13, wherein said pairs of bearings connect said rigid portion with said opposite side portions at points on said rigid portion longitudinally between said ignition plug boss portions.

15. The cam carrier of claim 12, wherein said pairs of bearings connects said rigid portion with said opposite side portions at points on said rigid portion longitudinally between said ignition plug boss portions.

16. The cam carrier of claim 12, wherein bolt holes are provided in said opposite side portions at each said slit between said pairs of bearings and bolt holes are provided in said rigid portion such that two said bolt holes are disposed on opposite sides of each said ignition plug boss portion in the longitudinal direction.

* * * * *

UNITED STATES PATENT AND TRADEMARK OFFICE
CERTIFICATE OF CORRECTION

PATENT NO. : 5,220,853

DATED : June 22, 1993

INVENTOR(S) : Osamu SADO et al.

It is certified that error appears in the above-identified patent and that said Letters Patent is hereby corrected as shown below:

On title page,

Item [73], change "Matsushita Electric Industrial Co., Ltd., Osaka, Japan" to

--Mazda Motor Corporation, Hiroshima-ken, Japan--.

Signed and Sealed this

First Day of March, 1994

*Attest:*

Bruce Lehman

BRUCE LEHMAN

*Attesting Officer*

*Commissioner of Patents and Trademarks*